No. 657,496. Patented Sept. 4, 1900.
E. W. PALMQUIST.
TENDER COUPLING.
(Application filed June 4, 1900.)
(No Model.)
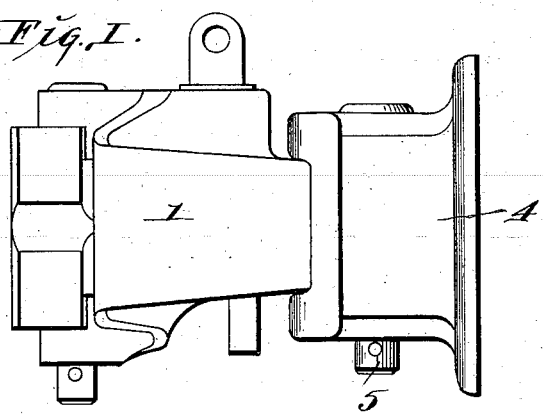
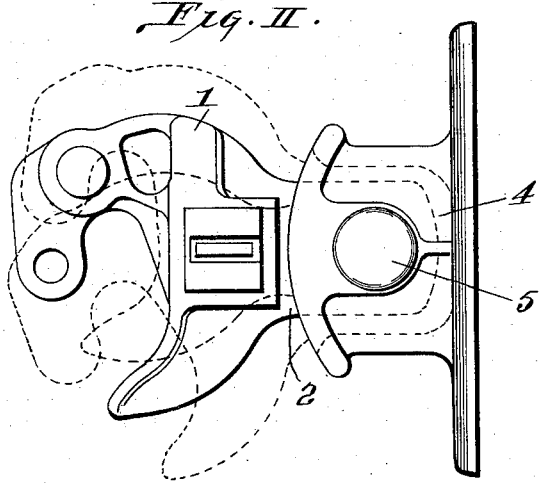
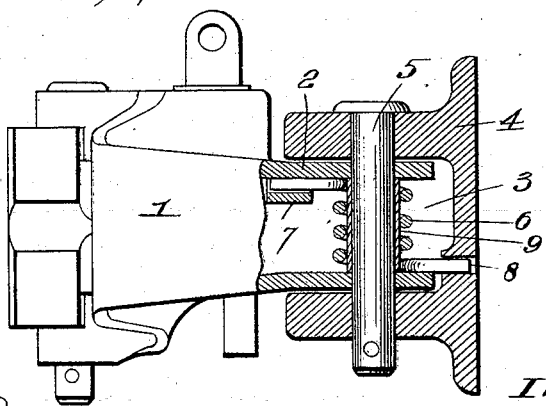
Attest:
O. G. Roe
J. E. Knight
Inventor:
Eric W. Palmquist
By Knight Bros. atty's

UNITED STATES PATENT OFFICE.

ERIC W. PALMQUIST, OF ST. LOUIS, MISSOURI, ASSIGNOR TO THE SHICKLE, HARRISON & HOWARD IRON COMPANY, OF SAME PLACE.

TENDER-COUPLING.

SPECIFICATION forming part of Letters Patent No. 657,496, dated September 4, 1900.

Application filed June 4, 1900. Serial No. 18,925. (No model.)

*To all whom it may concern:*

Be it known that I, ERIC W. PALMQUIST, a citizen of the United States, residing at the city of St. Louis, in the State of Missouri, have invented certain new and useful Improvements in Tender-Couplers, of which the following is a full, clear, and exact description, reference being had to the accompanying drawings, forming part of this specification.

My invention relates to an improved construction of coupler to be used on the tenders of railway-trains.

My invention consists in features of novelty hereinafter fully described, and pointed out in the claims.

Figure I is a side elevation of my improved coupler. Fig. II is a top or plan view. Fig. III is a side view, part in vertical section.

1 represents the head of the coupler, including the knuckle, pivot-pin, and locking-pin, which may be of any desired construction and which, as shown, is of the construction set forth in Letters Patent No. 538,581, issued to the Shickle, Harrison & Howard Iron Company April 30, 1895.

The coupler has a short shank 2, fitting loosely in a chamber 3, formed in a bracket 4, designed to be bolted or otherwise secured to the end timbers of a tender. The shank is connected to the bracket by means of a pivot-pin 5, which permits the head to swing in a horizontal plane (as shown in dotted lines, Fig. II) as the train passes over curves in the track, the width of the chamber 3 being made somewhat greater than the width of the shank, so as to permit of this play of the head of the coupler.

For coupling purposes the head should be held normally in line with the length of the tender, and to accomplish this I employ a spring 6, that is coiled about the pin 5 within the hollow shank 2, one end of the spring bearing against a lug 7, formed on the interior of the shank, (see Fig. III,) and the other end of the spring fitting in a hole 8, formed in the bracket 4. A sleeve 9 may be interposed between the spring and the pin, as shown.

The device forms a neat, durable, and efficient tender-coupler.

I claim as my invention—

1. In a tender-coupler, the combination of a head provided with a short hollow shank, a chambered bracket within which said shank fits, a pivot-pin connecting the shank and bracket together, and a spring coiled about the pivot-pin within the hollow shank one end of which bears against the shank and the other against the bracket, substantially as and for the purpose set forth.

2. In a tender-coupler, the combination of a head provided with a short hollow shank, a chambered bracket within which said shank fits, a pivot-pin connecting the shank and bracket together, and a spring coiled about the pivot-pin within the hollow shank, one end of which bears against a lug on the shank and the other end of which fits in a hole in the bracket, substantially as and for the purpose set forth.

ERIC W. PALMQUIST.

In presence of—
   GEO. G. FLOYD,
   AUBREY EDDIE.